United States Patent
Chiu

(10) Patent No.: US 11,396,261 B2
(45) Date of Patent: Jul. 26, 2022

(54) STEERING WHEEL

(71) Applicant: PEGATRON CORPORATION, Taipei (TW)

(72) Inventor: Yu-Hao Chiu, Taipei (TW)

(73) Assignee: PEGATRON CORPORATION, Taipei (TW)

(*) Notice: Subject to any disclaimer, the term of this patent is extended or adjusted under 35 U.S.C. 154(b) by 199 days.

(21) Appl. No.: 16/878,685

(22) Filed: May 20, 2020

(65) Prior Publication Data
US 2020/0385048 A1 Dec. 10, 2020

(30) Foreign Application Priority Data

Jun. 5, 2019 (TW) ................................. 108119498

(51) Int. Cl.
*B60Q 5/00* (2006.01)
*B62D 1/04* (2006.01)
(Continued)

(52) U.S. Cl.
CPC ............. *B60Q 5/003* (2013.01); *B62D 1/046* (2013.01); *B62D 1/06* (2013.01); *B62D 1/08* (2013.01); *B62D 1/10* (2013.01)

(58) Field of Classification Search
CPC .......... B60Q 5/003; B62D 1/046; B62D 1/06; B62D 1/08; B62D 1/10
(Continued)

(56) References Cited

U.S. PATENT DOCUMENTS 5,309,135 A * 5/1994 Langford .......... B60R 21/21658
338/50
9,254,786 B2 2/2016 Verner
(Continued)

FOREIGN PATENT DOCUMENTS

CN 106476687 A 3/2017
CN 107627954 A 1/2018
(Continued)

OTHER PUBLICATIONS

Extended EP Search Report issued in corresponding EP application No. 2017-8558.1 dated Oct. 15, 2020.
(Continued)

*Primary Examiner* — Kerri L McNally
(74) *Attorney, Agent, or Firm* — Muncy, Geissler, Olds & Lowe, P.C.

(57) ABSTRACT

A steering wheel for vehicle having a steering column includes a steering wheel main body and a horn control assembly. The steering wheel main body includes a pressing portion, a handle and at least one connection portion. The handle is disposed around the pressing portion. The connection portion connects the handle to the pressing portion. The horn control assembly includes a pressure sensing module, a control module and a horn. The pressure sensing module is disposed at the pressing portion for sensing the pressed status of the pressing portion and outputting a pressure sensing signal. The control module is configured to have preset pressure ranges and connected to the pressure sensing module. The preset pressure ranges correspond to multiple volume levels of the horn. The control module receives the pressure sensing signal and compares it with the preset pressure ranges to control the volume of the horn to sound.

10 Claims, 8 Drawing Sheets

(51) Int. Cl.
*B62D 1/06* (2006.01)
*B62D 1/08* (2006.01)
*B62D 1/10* (2006.01)

(58) Field of Classification Search
USPC ..................................................... 340/425.5
See application file for complete search history.

(56) References Cited

U.S. PATENT DOCUMENTS

| 9,738,220 B2 | 8/2017 | Borghi | |
| 2003/0006897 A1* | 1/2003 | Chapin | B60Q 1/54 |
| | | | 340/425.5 |
| 2017/0057409 A1* | 3/2017 | Borghi | B60Q 5/003 |
| 2019/0047470 A1* | 2/2019 | Thompson | B60Q 5/003 |

FOREIGN PATENT DOCUMENTS

| CN | 206968757 U | 2/2018 |
| DE | 20302085 U1 | 7/2003 |
| DE | 102011088486 A1 | 6/2013 |
| EP | 2544920 A1 | 1/2013 |
| JP | 2011-213343 A | 10/2011 |
| KR | 10-1999-0055629 | 7/1999 |
| KR | 101804817 B1 | 12/2017 |
| WO | WO-2011-110352 A1 | 9/2011 |

OTHER PUBLICATIONS

Office Action issued in corresponding KR application No. 10-2020-0015081 dated Jan. 4, 2021.

* cited by examiner

STEERING WHEEL

CROSS REFERENCE TO RELATED APPLICATIONS

This Non-provisional application claims priority under 35 U.S.C. § 119(a) on Patent Application No(s). 108119498 filed in Taiwan, Republic of China on Jun. 5, 2019, the entire contents of which are hereby incorporated by reference.

BACKGROUND

Technology Field

The present disclosure relates to a steering wheel and, in particular, to a steering wheel having a pressure sensing module for detecting the pressing force from the user so as to correspondingly control the volume of the horn.

Related Art

Vehicles are usually equipped with horns so that the driver can alert or signal others when necessary. For example, the relay of a conventional car horn is installed in the center of the steering wheel. When the driver presses the horn button, the current will flow through the loop to the electromagnetic coil of the horn relay. The electromagnetic coil attracts the relay's touch point switch to close, so that the current flows to the horn for controlling the electromagnet inside the horn to operate. Accordingly, the vibration film of the horn is vibrated and the car horn can make a sound.

However, the conventional car horns can only control whether or not to make a sound, but cannot control the volume of the horn. When the driver only wants to remind others, he or she cannot adjust the horn volume according to the actual requirements. If the driver slightly presses the horn button, the current may not be applied to the horn relay, so that the horn cannot make a sound. However, if the driver hardly presses the horn button to apply the current to the horn relay, the loud horn volume may frighten the other drivers or cause other drivers to be considered provocative.

Therefore, it is important to provide a steering wheel having a horn volume adjustable function according to the pressing force of driver, thereby achieving the desired alerting or reminding purpose and avoiding to frighten or provoke other drivers.

SUMMARY

In view of the foregoing, this disclosure is to provide a steering wheel that can adjust the horn volume according to the pressing force of driver, thereby achieving the desired alerting or reminding purpose and avoiding to frighten or provoke other drivers.

To achieve the above, the present disclosure is to provide a steering wheel for a vehicle having a steering column. The steering wheel includes a steering wheel main body and a horn control assembly. The steering wheel main body is connected to the steering column and includes a pressing portion, a handle and at least one connection portion. The handle is disposed around the periphery of the pressing portion. The at least one connection portion connects the handle to the pressing portion. The horn control assembly includes a pressure sensing module, a control module and a horn. The pressure sensing module is disposed at the pressing portion for sensing a pressed status of the pressing portion and outputting a pressure sensing signal. The control module is configured to have a plurality of preset pressure ranges and is electrically connected to the pressure sensing module for receiving the pressure sensing signal from the pressure sensing module and comparing the pressure sensing signal with the preset pressure ranges. The horn is electrically connected to the control module. The preset pressure ranges are corresponding to a plurality of volume levels of the horn, and the control module controls a volume of the horn to sound after comparing the pressure sensing signal with the preset pressure ranges.

In one embodiment, the volume increases as the corresponding preset pressure range increases.

In one embodiment, the volumes corresponding to one of the preset pressure ranges increase as values of the corresponding preset pressure range increase.

In one embodiment, the volumes corresponding to one of the preset pressure ranges remain the same as values of the corresponding preset pressure range increase.

In one embodiment, the preset pressure ranges are between 0 g/cm$^2$ and 3600 g/cm$^2$, and the volume is between 0 dB and 112 dB.

In one embodiment, the steering wheel main body further includes a cover layer disposed on the pressing portion, and the pressure sensing module is disposed between the pressing portion and the cover layer.

In one embodiment, the pressure sensing module is disposed on a surface of the pressing portion away from the steering column.

In one embodiment, the pressure sensing module is disposed on a surface of the pressing portion facing toward the steering column.

In one embodiment, the pressure sensing module is a resistive pressure sensor, an inductive pressure sensor, a capacitive pressure sensor, a piezoresistive pressure sensor, a piezoresistive strain gage pressure sensor, or a semiconductor strain gage pressure sensor.

In one embodiment, the pressure sensing module is disposed at a center of the pressing portion.

As mentioned above, the steering wheel of this disclosure can adjust the horn volume according to the pressing force of driver, thereby achieving the desired alerting or reminding purpose and avoiding to frighten or provoke other drivers.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE EMBODIMENT

The present disclosure will be apparent from the following detailed description, which proceeds with reference to the accompanying drawings, wherein the same references relate to the same elements.

Figure 1A:
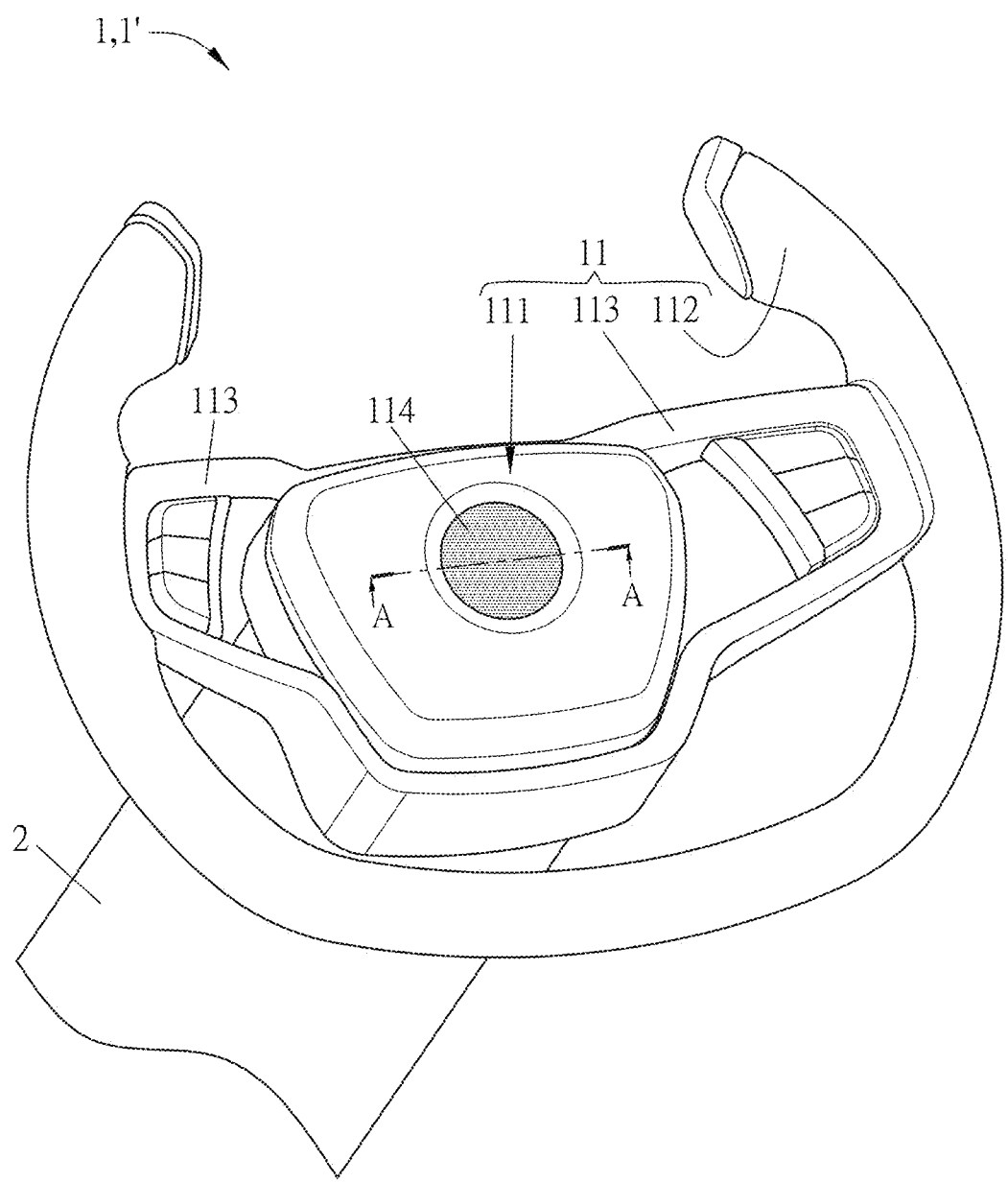
FIG. 1A is a schematic diagram showing a steering wheel according to a first embodiment and a second embodiment of the disclosure.
Figure 1B:
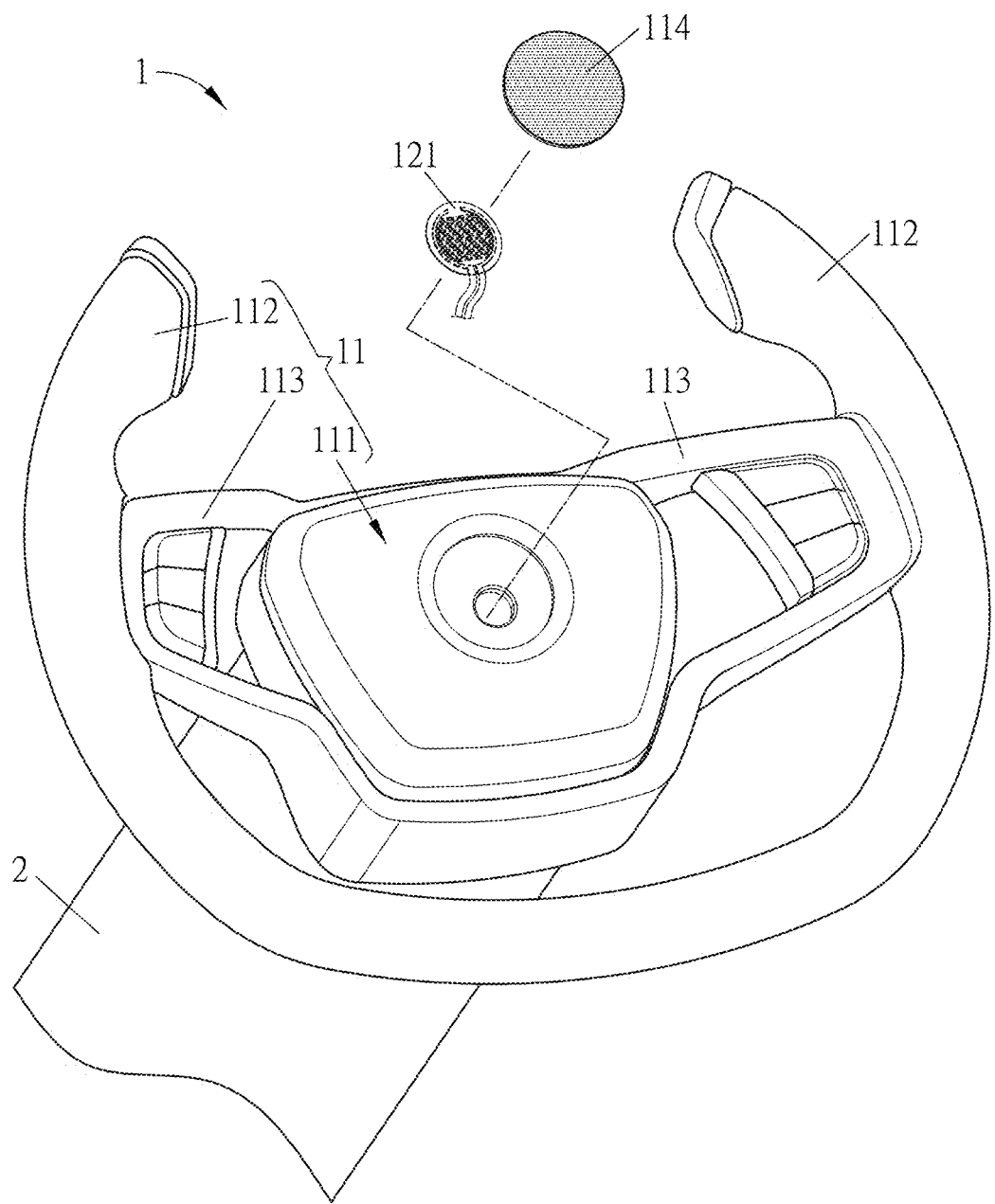
FIG. 1B is an exploded view of the steering wheel of the first embodiment shown in FIG. 1A.
Figure 2:
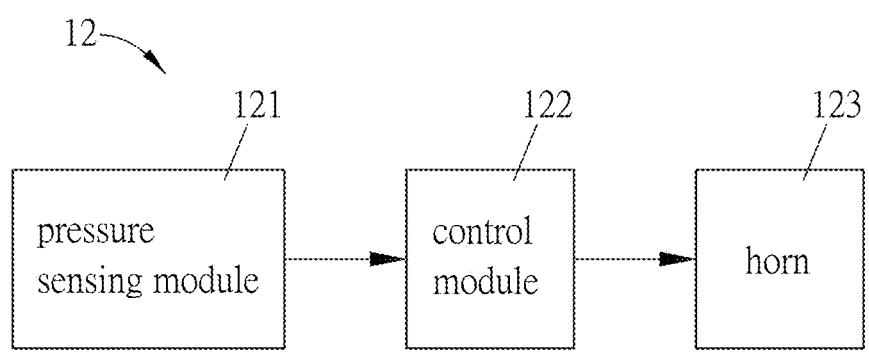
FIG. 2 is a schematic diagram showing the cooperation of the horn control assembly of the steering wheel of this disclosure.

FIG. 1A is a schematic diagram showing a steering wheel according to a first embodiment and a second embodiment of the disclosure, FIG. 1B is an exploded view of the steering wheel of the first embodiment shown in FIG. 1A, and FIG. 2 is a schematic diagram showing the cooperation of the horn control assembly of the steering wheel of this disclosure. Referring to FIGS. 1A, 1B and 2, the steering wheel 1, 1' of this embodiment is installed in a vehicle (not shown) having a steering column 2. The steering wheel 1, 1' includes a steering wheel main body 11 and a horn control assembly 12. The steering wheel main body 11 is connected to the steering column 2, and they are linking operated. The steering wheel main body 11 includes a pressing portion 111, a handle 112, and at least one connection portion 113. The handle 112 is disposed around the periphery of the pressing portion 111. The at least one connection portion 113 connects the handle 112 to the pressing portion 111. The horn control assembly 12 includes a pressure sensing module 121, a control module 122, and a horn 123. The pressure sensing module 121 is disposed at the pressing portion 111 for sensing a pressed status of the pressing portion 111 and outputting a pressure sensing signal. The control module 122 has a plurality of preset pressure ranges and is electrically connected to the pressure sensing module 121 for receiving the pressure sensing signal from the pressure sensing module 121 and comparing the pressure sensing signal with the preset pressure ranges. The horn 123 is electrically connected to the control module 122. The preset pressure ranges are corresponding to a plurality of volume levels of the horn 123, and the control module 122 controls a volume of the horn 123 after comparing the pressure sensing signal with the preset pressure ranges. In particular, the steering wheel main body 11 of the steering wheel 1, 1' of this embodiment includes two connection portions 113. To be noted, the number of the connection portions 113 of the steering wheel main body 11 is not limited to this embodiment and can be modified according to the requirement of user. In addition, the handle 112 of this embodiment has a ring shape with a recess. However, the shape of the handle 112 and the position and amount of the recess can be modified according to the requirement of user, and this disclosure is not limited thereto.

In this embodiment, the pressure sensing module 121 is configured to directly measure the pressure. In practice, the driver applies a force to the pressure sensing module 121 (the horn control assembly 12), the pressure sensing module 121 can measure the applied force (pressure) to obtain a pressure sensing value. The unit of the pressure sensing value is, for example, $g/cm^2$, which indicates the pressure per unit area. The pressure sensing module can be, for example, a resistive pressure sensor, an inductive pressure sensor, a capacitive pressure sensor, a piezoresistive pressure sensor, a piezoresistive strain gage pressure sensor, a semiconductor strain gage pressure sensor, or any of other pressure sensors, and this disclosure is not limited.

Figure 1C:
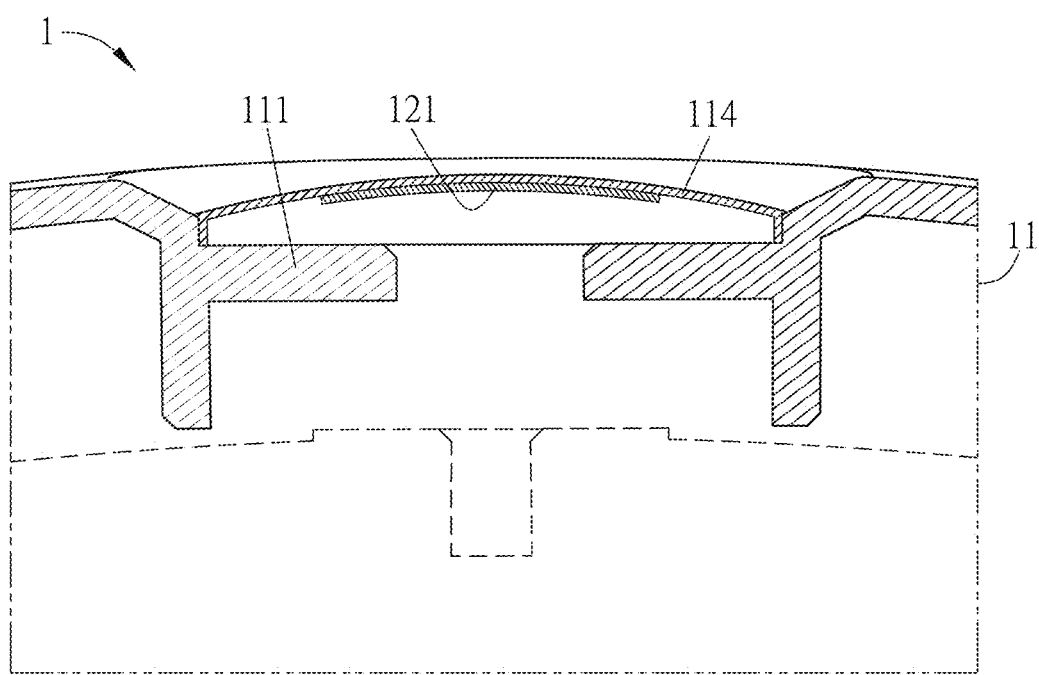
FIG. 1C is a sectional view of the steering wheel of the first embodiment shown in FIG. 1A along the line A-A.

FIG. 1C is a sectional view of the steering wheel of the first embodiment shown in FIG. 1A along the line A-A. In this embodiment, referring to FIGS. 1B and 1C, the pressure sensing module 121 is disposed at the center of the pressing portion 111. The steering wheel main body 11 may further include a cover layer 114 disposed on the pressing portion 111, and the pressure sensing module 121 is disposed between the pressing portion 111 and the cover layer 114. In particular, the cover layer 114 of this embodiment is a metal layer, and the meal layer only covers the center of the pressing portion 111. To be noted, the cover layer 114 can also be made of any known material for covering the steering wheel such as leather, plastic, rubber, or the like, and the covering range thereof can be modified based on the requirement of the user. This disclosure is not limited. In addition, the position of the pressure sensing module 121 can also be adjusted based on the requirement of the user.

Figure 1D:
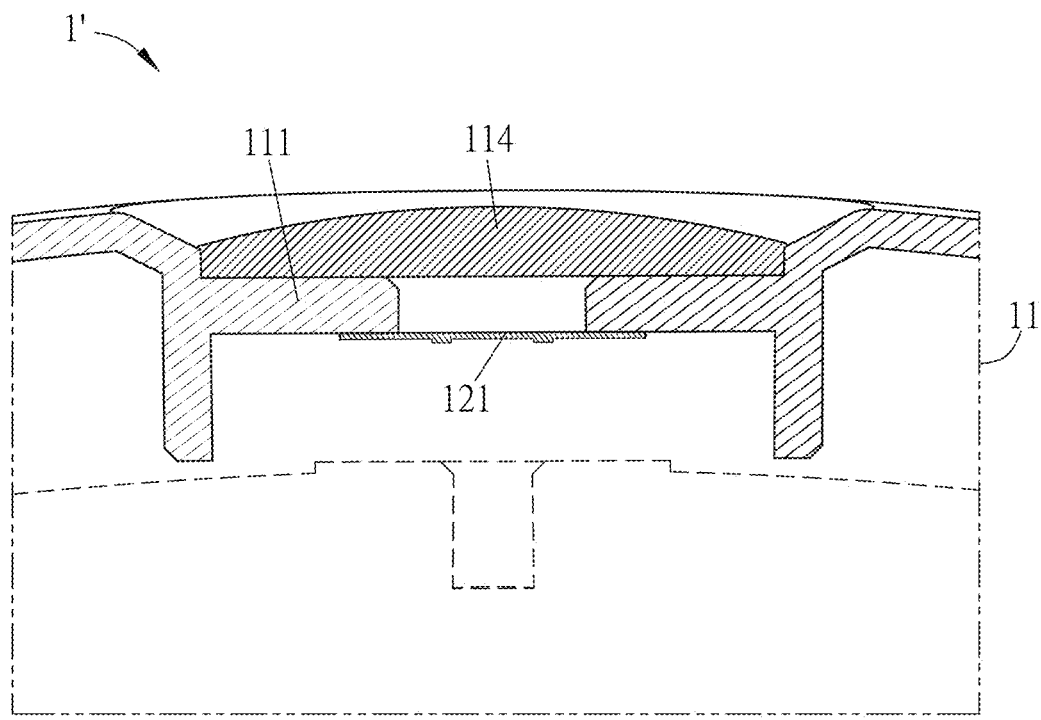
FIG. 1D is a sectional view of the steering wheel of the second embodiment shown in FIG. 1A along the line A-A.

FIG. 1D is a sectional view of the steering wheel of the second embodiment shown in FIG. 1A along the line A-A. In this embodiment, referring to FIG. 1D, the pressure sensing module 121 of the steering wheel 1' is disposed on a surface of the pressing portion 111 facing toward the steering column 2 (the side away from the cover layer 114). Of course, the pressure sensing module 121 can be disposed on another surface of the pressing portion 111 away from the steering column 2 (the side facing toward the cover layer 114 (not shown)). The pressure sensing module 121 can be disposed at any position that can detect the pressed status of the pressing portion 111, and this disclosure is not limited. In addition, the structure, components, and functions of the steering wheel 1' can be referred to those of the steering wheel 1 of the previous embodiment. The difference between the first and second embodiments is only the positions of the pressure sensing modules 121.

Figure 3A:
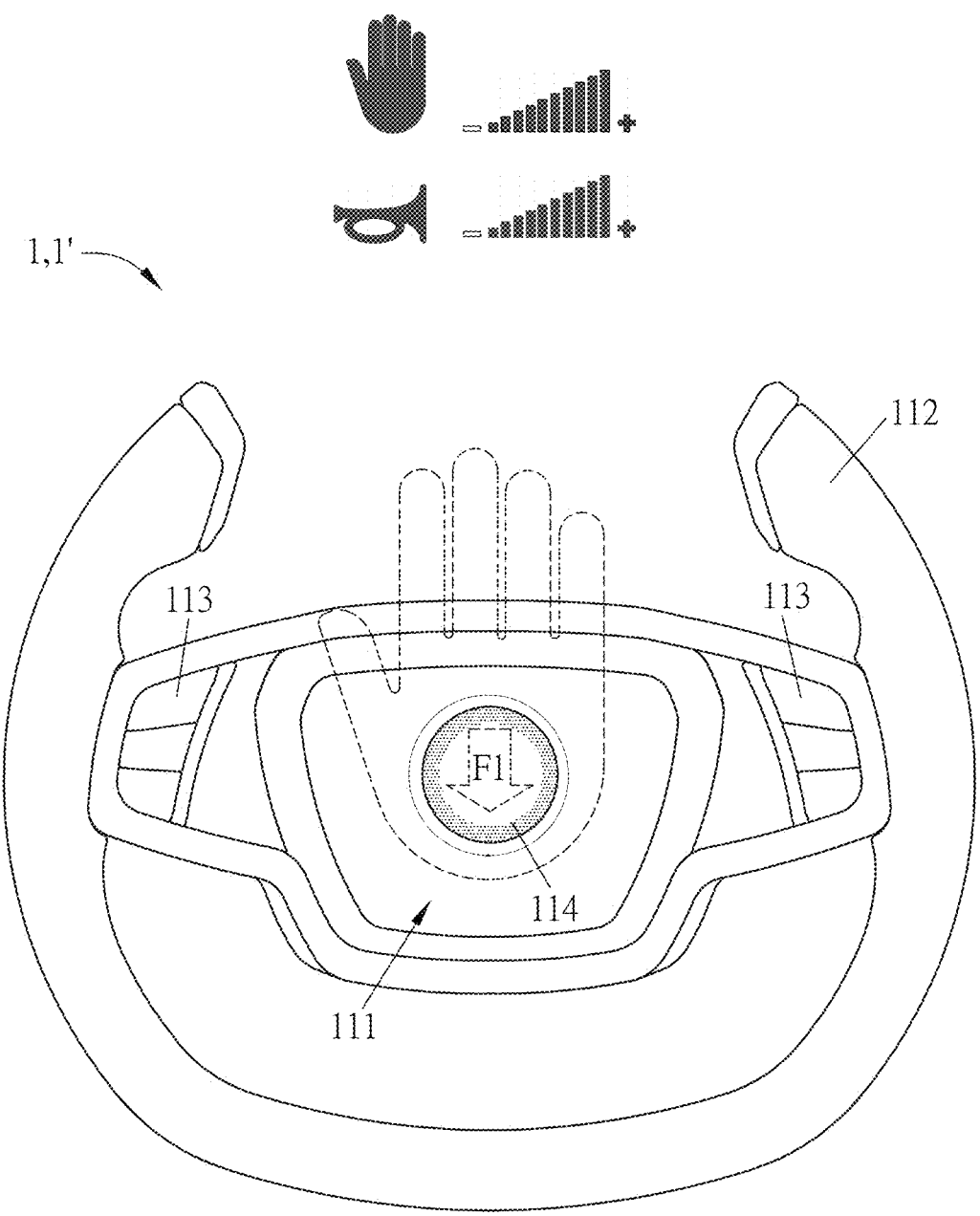
FIG. 3A is a schematic diagram showing an operation of the steering wheel of this disclosure.
Figure 3B:
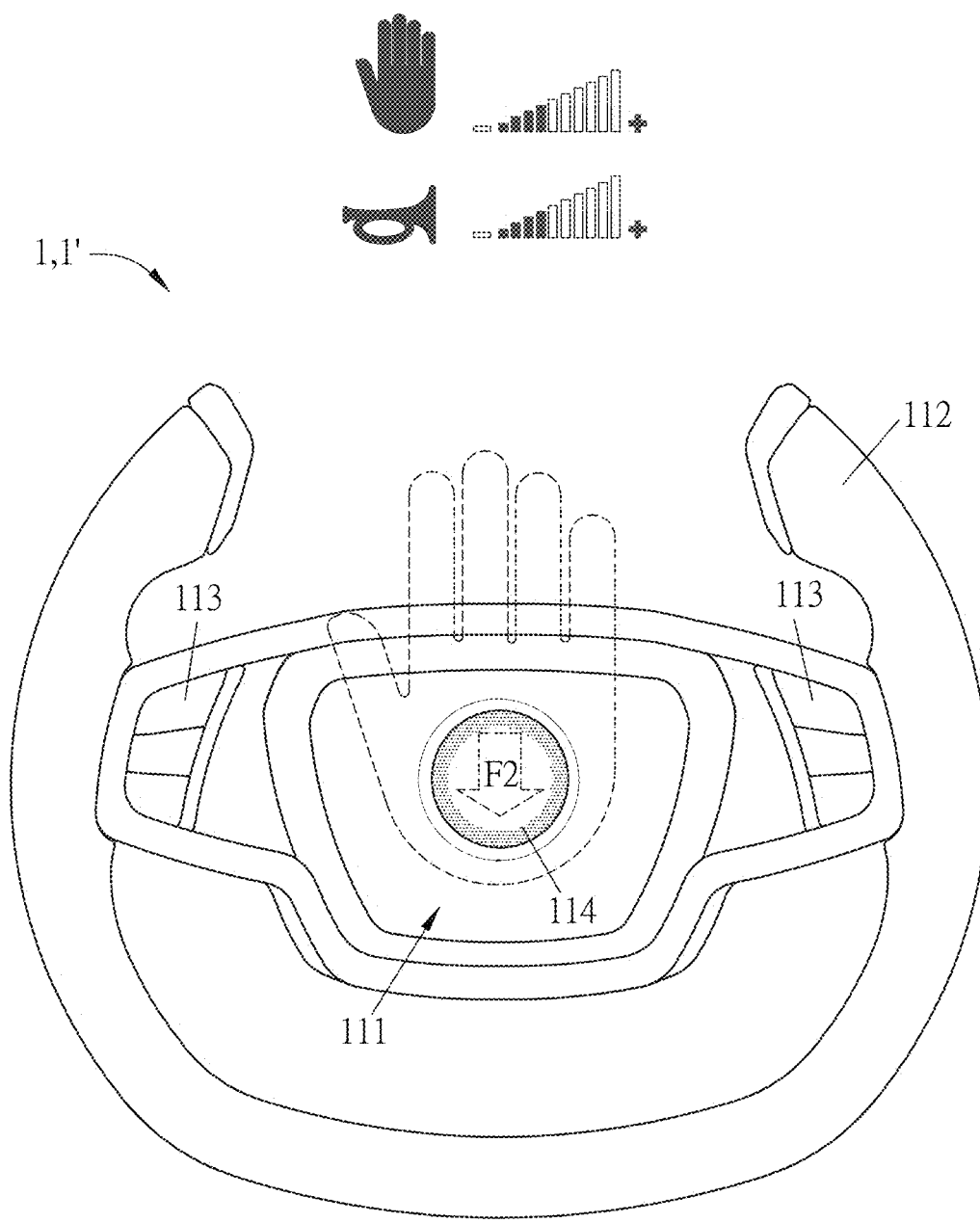
FIG. 3B is a schematic diagram showing another operation of the steering wheel of this disclosure.
Figure 4A:
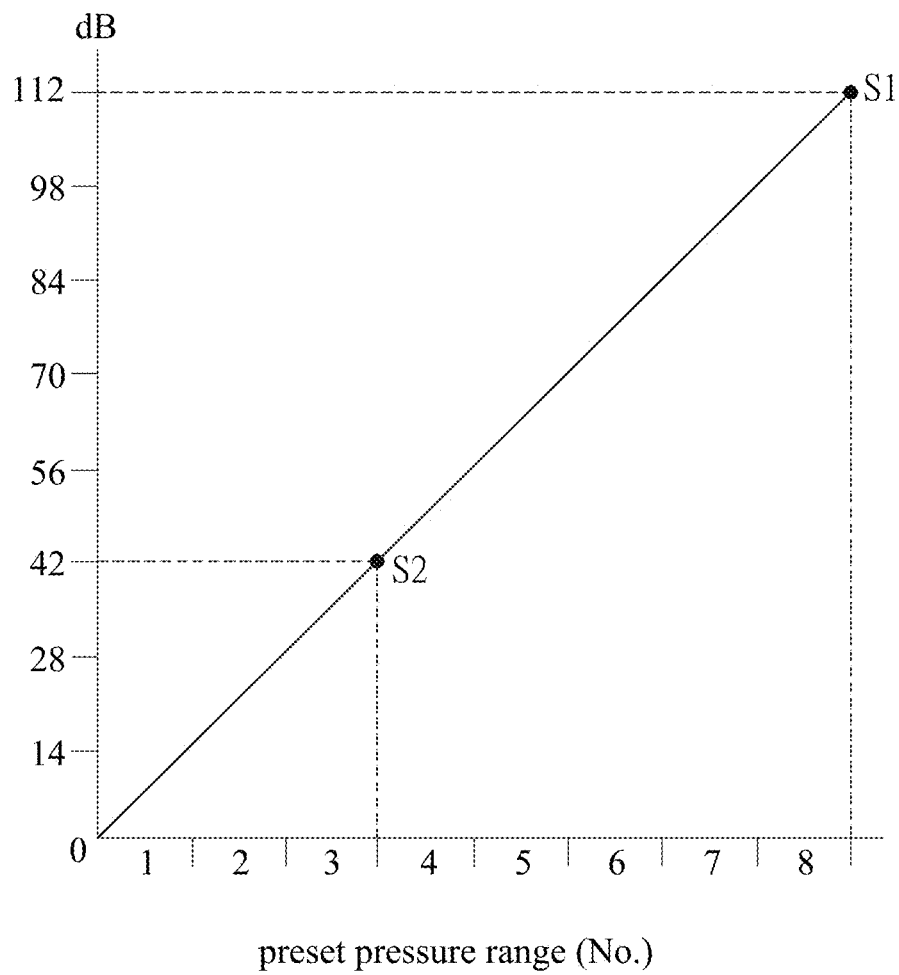
FIG. 4A is a schematic graph showing a relation between the volume of the horn and the preset pressure range of the steering wheel of this disclosure.

FIG. 3A is a schematic diagram showing an operation of the steering wheel of this disclosure, FIG. 3B is a schematic diagram showing another operation of the steering wheel of this disclosure, and FIG. 4A is a schematic graph showing a relation between the volume of the horn and the preset pressure range of the steering wheel of this disclosure. Referring to FIGS. 3A, 3B and 4A in view of FIGS. 1B and 2, the following embodiment discloses how to control the volume of the horn according to the pressing force of the driver applied to the steering wheel of this disclosure. FIG. 3A shows that the driver applies a larger pressing force, and FIG. 3B shows that the driver applies a smaller pressing force. When the driver presses the pressing portion 111, the pressure sensing module 121 senses a pressed status of the pressing portion 111 and then outputs a pressure sensing signal accordingly. The control module 122 receives the pressure sensing signal from the pressure sensing module 121 and compares the pressure sensing signal with the preset pressure ranges, thereby controlling the corresponding volume of the horn 123. In more detailed, as shown in FIG. 4A, the preset pressure ranges are corresponding to a plurality of volume levels of the horn 123, and the volume levels increase as the corresponding preset pressure ranges increase. In this embodiment, the control module 122 has eight preset pressure ranges, which corresponds to different volume levels of the horn 123. To be noted, the amount of the preset pressure ranges can be adjusted based on the requirement of the user, and this disclosure is not limited thereto.

Referring to FIGS. 3A, 1B, 2 and 4A, the driver applies a larger pressing force to the pressing portion 111. In this embodiment, the driver applies a force F1 to the pressing portion 111, and then the pressing portion 111 outputs a pressure sensing signal 51 to the control module 122. Afterwards, the control module 122 compares the pressure sensing signal 51 with the eight preset pressure ranges so as to determine that the pressure sensing signal 51 corresponds to the eighth preset pressure range (112 dB). Thus, the control module 122 outputs an electronic signal to control the horn 123 to output a sound of 112 dB.

Referring to FIGS. 3B, 1B, 2 and 4A, the driver applies a smaller pressing force to the pressing portion 111. In this embodiment, the driver applies a force F2 to the pressing portion 111, and then the pressing portion 111 outputs a pressure sensing signal S2 to the control module 122. Afterwards, the control module 122 compares the pressure sensing signal S2 with the eight preset pressure ranges so as to determine that the pressure sensing signal S2 corresponds to the third preset pressure range (42 dB). Thus, the control module 122 outputs an electronic signal to control the horn 123 to output a sound of 42 dB.

Figure 4B:
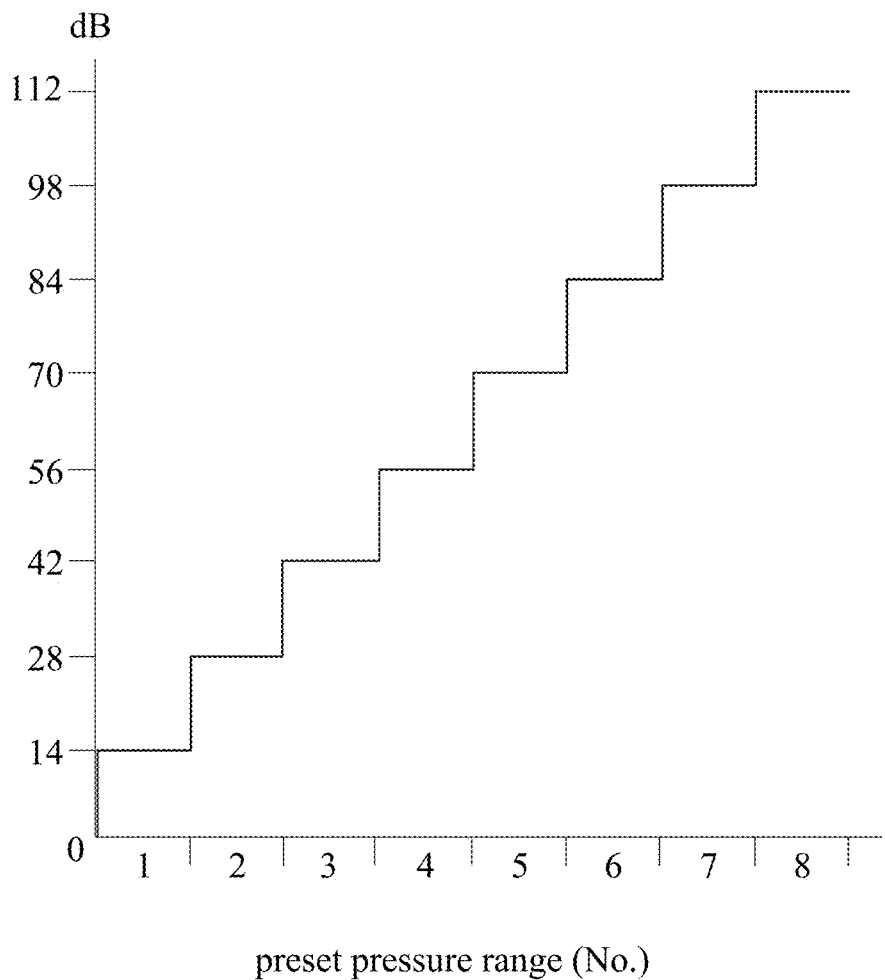
FIG. 4B is a schematic graph showing another relation between the volume of the horn and the preset pressure range of the steering wheel of this disclosure.

FIG. 4B is a schematic graph showing another relation between the volume of the horn and the preset pressure range of the steering wheel of this disclosure. In this embodiment, with reference to FIGS. 4A and 4B in view of FIG. 2, the preset pressure ranges are between 0 g/cm$^2$ and 3600 g/cm$^2$, and the volume is between 0 dB and 112 dB. For example, as shown in FIGS. 4A and 4B, the control module 122 has eight preset pressure ranges, which correspond to different volume (dB). The preset pressure ranges and the corresponding volumes (dB) are listed in the following Table 1 and Table 2. In particular, as shown in Table 1, the preset pressure ranges and the corresponding volumes have a linear increasing relationship as shown in FIG. 4A. In brief, when the preset pressure ranges increase, the volumes (dB) of the horn 123 are corresponding increased, and the volumes (dB) of the horn 123 corresponding to the same one preset pressure range also increase as the values in the same one preset pressure range increase. As shown in Table 2, the preset pressure ranges and the corresponding volumes have a stepwise increasing relationship as shown in FIG. 4B. In brief, when the preset pressure ranges increase, the volumes (dB) of the horn 123 are corresponding increased, but the volumes (dB) of the horn 123 corresponding to the same one preset pressure range also remains the same as the values in the same one preset pressure range increase.

Under the configuration of FIG. 4A, referring to FIG. 2 and Table 1, when the pressure sensing signal is equivalent to 600 g/cm$^2$, the control module 122 compares the signal with the preset pressure ranges so as to find that the signal corresponds to the second preset pressure range, which corresponds to 28 dB. Then, the control module 122 further controls the horn 123 to output a sound of 28 dB. When the pressure sensing signal is equivalent to 850 g/cm$^2$, the control module 122 compares the signal with the preset pressure ranges so as to find that the signal corresponds to the third preset pressure range. In the case of FIG. 4A, the control module 122 further calculates the corresponding volume according to the pressure sensing signal and the values of two ends of the preset pressure range by interpolation (Y=aX+b, wherein a=0.028, b=11.2, X is the value of the preset pressure range, and Y is the volume of the horn 123). According to the calculation, the corresponding volume is 35 dB, so that the control module 122 controls the horn 123 to output a sound of 35 dB.

TABLE 1

| Preset pressure range (No.) | Preset pressure range (g/cm$^2$) | Volume (dB) |
| --- | --- | --- |
| 1 | 1~100 | 1~14 |
| 2 | 101~600 | 15~28 |
| 3 | 601~1100 | 29~42 |
| 4 | 1101~1600 | 43~56 |
| 5 | 1601~2100 | 57~70 |
| 6 | 2101~2600 | 71~84 |
| 7 | 2601~3100 | 85~98 |
| 8 | 3101~3600 | 99~112 |

Under the configuration of FIG. 4B, referring to FIG. 2 and Table 2, when the pressure sensing signal is equivalent to 600 g/cm$^2$, the control module 122 compares the signal with the preset pressure ranges so as to find that the signal corresponds to the second preset pressure range, which corresponds to 28 dB. Then, the control module 122 further controls the horn 123 to output a sound of 28 dB. When the pressure sensing signal is equivalent to 850 g/cm$^2$, the control module 122 compares the signal with the preset pressure ranges so as to find that the signal corresponds to the third preset pressure range, which corresponds to 42 dB. Then, the control module 122 further controls the horn 123 to output a sound of 42 dB.

TABLE 2

| Preset pressure range (No.) | Preset pressure range (g/cm$^2$) | Volume (dB) |
| --- | --- | --- |
| 1 | 1~100 | 14 |
| 2 | 101~600 | 28 |
| 3 | 601~1100 | 42 |
| 4 | 1101~1600 | 56 |
| 5 | 1601~2100 | 70 |
| 6 | 2101~2600 | 84 |
| 7 | 2601~3100 | 98 |
| 8 | 3101~3600 | 112 |

As mentioned above, the steering wheel of this disclosure can adjust the horn volume according to the pressing force of driver, thereby achieving the desired alerting or reminding purpose and avoiding to frighten or provoke other drivers.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A steering wheel for a vehicle having a steering column, comprising:
   a steering wheel main body connected to the steering column and comprising:
   a pressing portion,
   a handle disposed around a periphery of the pressing portion, and
   at least one connection portion connecting the handle to the pressing portion; and
   a horn control assembly comprising:
   a pressure sensing module disposed at the pressing portion for sensing a pressed status of the pressing portion and outputting a pressure sensing signal,
   a control module configured to have a plurality of preset pressure ranges and electrically connected to the pressure sensing module for receiving the pressure sensing signal from the pressure sensing module and comparing the pressure sensing signal with the preset pressure ranges, and a horn electrically connected to the control module, wherein the preset pressure ranges are corresponding to a plurality of volume levels of the horn, and the control module controls a volume of the horn to sound after comparing the pressure sensing signal with the preset pressure ranges, wherein the steering wheel main body further comprises a cover layer disposed on the pressing portion, and the pressure sensing module is disposed between the pressing portion and the cover layer.

2. The steering wheel of claim 1, wherein the volume increases as the corresponding preset pressure range increases.

3. The steering wheel of claim 2, wherein the volume corresponding to one of the preset pressure ranges increases as values of the corresponding preset pressure range increase.

4. The steering wheel of claim 2, wherein the volume corresponding to one of the preset pressure ranges remains the same as values of the corresponding preset pressure range increase.

5. The steering wheel of claim 2, wherein the preset pressure ranges are between 0 $g/cm^2$ and 3600 $g/cm^2$, and the volume is between 0 dB and 112 dB.

6. The steering wheel of claim 1, wherein the pressure sensing module is disposed on a surface of the pressing portion away from the steering column.

7. The steering wheel of claim 1, wherein the pressure sensing module is disposed on a surface of the pressing portion facing toward the steering column.

8. The steering wheel of claim 1, wherein the pressure sensing module is a resistive pressure sensor, an inductive pressure sensor, a capacitive pressure sensor, a piezoresistive pressure sensor, a piezoresistive strain gage pressure sensor, or a semiconductor strain gage pressure sensor.

9. The steering wheel of claim 1, wherein the pressure sensing module is disposed at a center of the pressing portion.

10. The steering wheel of claim 1, wherein the pressure sensing module is disposed on a surface of the pressing portion away from the steering column.

* * * * *